(12) United States Patent
Koehler et al.

(10) Patent No.: US 12,203,577 B2
(45) Date of Patent: *Jan. 21, 2025

(54) RETAINER FOR CLAMP ASSEMBLY

(71) Applicant: Ideal Clamp Products, Inc., Smyrna, TN (US)

(72) Inventors: Edwin T. Koehler, Smyrna, TN (US); Joshua B. Smith, Machester, TN (US)

(73) Assignee: Ideal Clamp Products, Inc., Smyrna, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,653

(22) Filed: Mar. 1, 2024

(65) Prior Publication Data

US 2024/0200690 A1    Jun. 20, 2024

Related U.S. Application Data

(63) Continuation of application No. 17/265,038, filed as application No. PCT/US2019/045434 on Aug. 7, 2019, now Pat. No. 11,920,710.

(Continued)

(51) Int. Cl.
*F16L 21/06*    (2006.01)
*F16L 3/10*    (2006.01)

(52) U.S. Cl.
CPC .................. *F16L 3/1075* (2013.01)

(58) Field of Classification Search
CPC ..... F16L 3/1075; F16L 3/1083; F16L 3/1008; F16L 3/10; F16L 21/065; F16L 23/003;
(Continued)

(56) References Cited

U.S. PATENT DOCUMENTS 2,192,087 A    2/1940    Kost
2,236,929 A    4/1941    Tinnerman
(Continued)

FOREIGN PATENT DOCUMENTS

CA    2591286 A1    12/2007
CN    103574171 A    2/2014
(Continued)

OTHER PUBLICATIONS

U.S. Patent & Trademark Office, International Search Report for related PCT/US2019/045434, Nov. 29, 2019, 4 pages.

(Continued)

*Primary Examiner* — Aaron M Dunwoody
(74) *Attorney, Agent, or Firm* — Barnes & Thornburg LLP

(57) ABSTRACT

Clamp assemblies and associated methods are disclosed. According to one aspect, a clamp assembly may comprise a shell, a tensioning mechanism, and a retainer. The shell includes a pair of segments sized to be positioned over a joint connection, with the pair of segments being moveable between an open position and a contracted position. The tensioning mechanism is operable to tighten the pair of segments and includes a threaded shaft extending through a segment opening defined in a first segment of the pair of segments. The retainer is coupled with the first segment and includes a first cantilevered flange configured to engage the threaded shaft to retain the threaded shaft in the segment opening when the shell is in the open position.

20 Claims, 9 Drawing Sheets

Related U.S. Application Data

(60) Provisional application No. 62/715,672, filed on Aug. 7, 2018.

(58) Field of Classification Search
CPC ......... F16L 23/006; F16L 23/04; F16L 23/08; F16L 23/12
USPC ............ 285/406, 407, 420; 24/455; 411/175
See application file for complete search history.

(56) References Cited

U.S. PATENT DOCUMENTS

| | | | |
|---|---|---|---|
| 2,835,954 | A | 5/1958 | Dahl |
| 9,518,684 | B2 | 12/2016 | Juzak et al. |
| 9,976,678 | B2 | 5/2018 | Cowham et al. |
| 11,920,710 | B2 | 3/2024 | Koehler et al. |
| 2006/0245843 | A1 | 11/2006 | Yoneoka |
| 2008/0019794 | A1* | 1/2008 | van Walraven ....... F16L 3/1083 411/175 |
| 2008/0159824 | A1 | 7/2008 | Okada et al. |
| 2010/0011546 | A1* | 1/2010 | Gelibert .............. F16B 37/0842 24/455 |
| 2014/0020814 | A1 | 1/2014 | Druke et al. |
| 2014/0028014 | A1 | 1/2014 | Breitenbach et al. |
| 2016/0223010 | A1 | 8/2016 | Williams et al. |
| 2016/0369531 | A1 | 12/2016 | Hommel |
| 2017/0227142 | A1 | 8/2017 | Huang |

FOREIGN PATENT DOCUMENTS

| | | |
|---|---|---|
| CN | 105422990 A | 3/2016 |
| CN | 106256672 A | 12/2016 |
| DE | 4015404 A1 | 12/1991 |
| JP | 2014025582 A | 2/2014 |

OTHER PUBLICATIONS

U.S. Patent & Trademark Office, Written Opinion for related PCT/US2019/045434, Nov. 29, 2019, 9 pages.

European Patent Office, Search Report for related EP19847260.7, Mar. 18, 2022, 10 pages.

Indian Patent Office, First Examination Report for related IN202117004539, May 8, 2022, 10 pages.

China National Intellectual Property Administration, First Office Action for related CN201980052840.3, Jun. 2, 2022, 17 pages (including translation).

U.S. Patent & Trademark Office, Office Action for related U.S. Appl. No. 17/265,038, Jul. 5, 2023, 8 pages.

Japanese Patent Office, Notification of Reasons for Rejection for related JP2021-506507, Sep. 26, 2023, 20 pages (including translation).

Indian Patent Office, Hearing Notice for related IN202117004539, Jan. 12, 2024, 4 pages.

* cited by examiner

RETAINER FOR CLAMP ASSEMBLY

CROSS-REFERENCE TO RELATED APPLICATIONS

This application is a continuation of U.S. patent application Ser. No. 17/265,038, now U.S. Pat. No. 11,920,710, the U.S. national stage entry of PCT International Patent Application No. PCT/US2019/045434, filed on Aug. 7, 2019, which claims the benefit of and priority to U.S. Provisional Patent Application No. 62/715,672, filed on Aug. 7, 2018. The entire disclosures of the foregoing references are incorporated herein by reference.

TECHNICAL FIELD

The present disclosure relates to clamp designs and, more specifically, to a design for a pipe or hose clamp assembly.

BACKGROUND

Pipe clamps may be used to secure the joints that connect pipes, hoses, ducting, tubing, filters, and other components. Some pipe clamps include multiple segments that are hinged together. A tensioning or locking mechanism may be used to couple the ends of the segments together and apply tension to the clamp. A radial load may be created by the tension and may be transmitted to the mating flanges of the joint as an axial load.

SUMMARY

According to one aspect of the present disclosure, a retainer for a clamp is disclosed. The retainer is configured to hold the clamp in position during, for example, shipping and installation, to ease installation.

According to another aspect of the present disclosure, a clamp assembly may comprise a shell, a tensioning mechanism, and a retainer. The shell may include a pair of segments sized to be positioned over a joint connection. The pair of segments may be moveable between an open position and a contracted position. The tensioning mechanism may be operable to tighten the pair of segments. The tensioning mechanism may include a threaded shaft extending through a segment opening defined in a first segment of the pair of segments. The retainer may be coupled with the first segment. The retainer may include a first cantilevered flange configured to engage the threaded shaft to retain the threaded shaft in the segment opening when the shell is in the open position.

In some embodiments, the first cantilevered flange may include a first pair of tips configured to engage the threaded shaft. The first pair of tips of the first cantilevered flange may be formed as curved tips. A first non-zero angle may be defined between the first pair of tips of the first cantilevered flange. The first non-zero angle may be equal to about 90 degrees.

In some embodiments, the retainer may include a second cantilevered flange configured to engage the threaded shaft to retain the threaded shaft in position relative to the first segment. A retainer opening for receiving the threaded shaft may be defined between the first and second cantilevered flanges. The second cantilevered flange may include a second pair of tips configured to engage the threaded shaft. The second pair of tips of the second cantilevered flange may be formed as curved tips. A second non-zero angle may be defined between the second pair of tips of the second cantilevered flange. The second non-zero angle may be equal to about 90 degrees. The threaded shaft may be positioned in the retainer opening.

In some embodiments, the retainer may include a frame having (i) a first end coupled with the first segment and (ii) a second end coupled with the first segment. The first cantilevered flange may extend away from the first end of the frame toward the second cantilevered flange. The second cantilevered flange may extend away from the second end of the frame toward the first cantilevered flange.

In some embodiments, the first and/or second cantilevered flanges may be configured to deflect elastically to permit the threaded shaft to move relative to the first segment.

In some embodiments, the first segment may include an ear and a tab extending from the ear. The retainer may include a first opening sized to receive the ear of the first segment. The retainer may include a second opening sized to receive the tab of the first segment.

In some embodiments, the retainer may be coupled with the first segment such that the first cantilevered flange is arranged between the pair of segments of the shell.

According to yet another aspect of the present disclosure, a method assembling the clamp assembly may comprise coupling the retainer with the first segment and engaging the threaded shaft with first cantilevered flange.

In some embodiments, coupling the retainer with the first segment may comprise arranging the first cantilevered flange between the pair of segments of the shell.

In some embodiments, coupling the retainer with the first segment may comprise arranging at least a portion of a frame of the retainer on a side of the first segment opposite the first cantilevered flange.

In some embodiments, arranging at least a portion of the frame on the side of the first segment opposite the first cantilevered flange may comprise arranging at least a portion of the frame of the retainer on a topside of an ear of the first segment opposite the first cantilevered flange.

BRIEF DESCRIPTION OF THE DRAWINGS

The foregoing and other features of the various embodiments of the methods and apparatuses described herein will become more apparent from the following detailed description and the accompanying drawings in which.

DETAILED DESCRIPTION OF THE DRAWINGS

Figure 1:
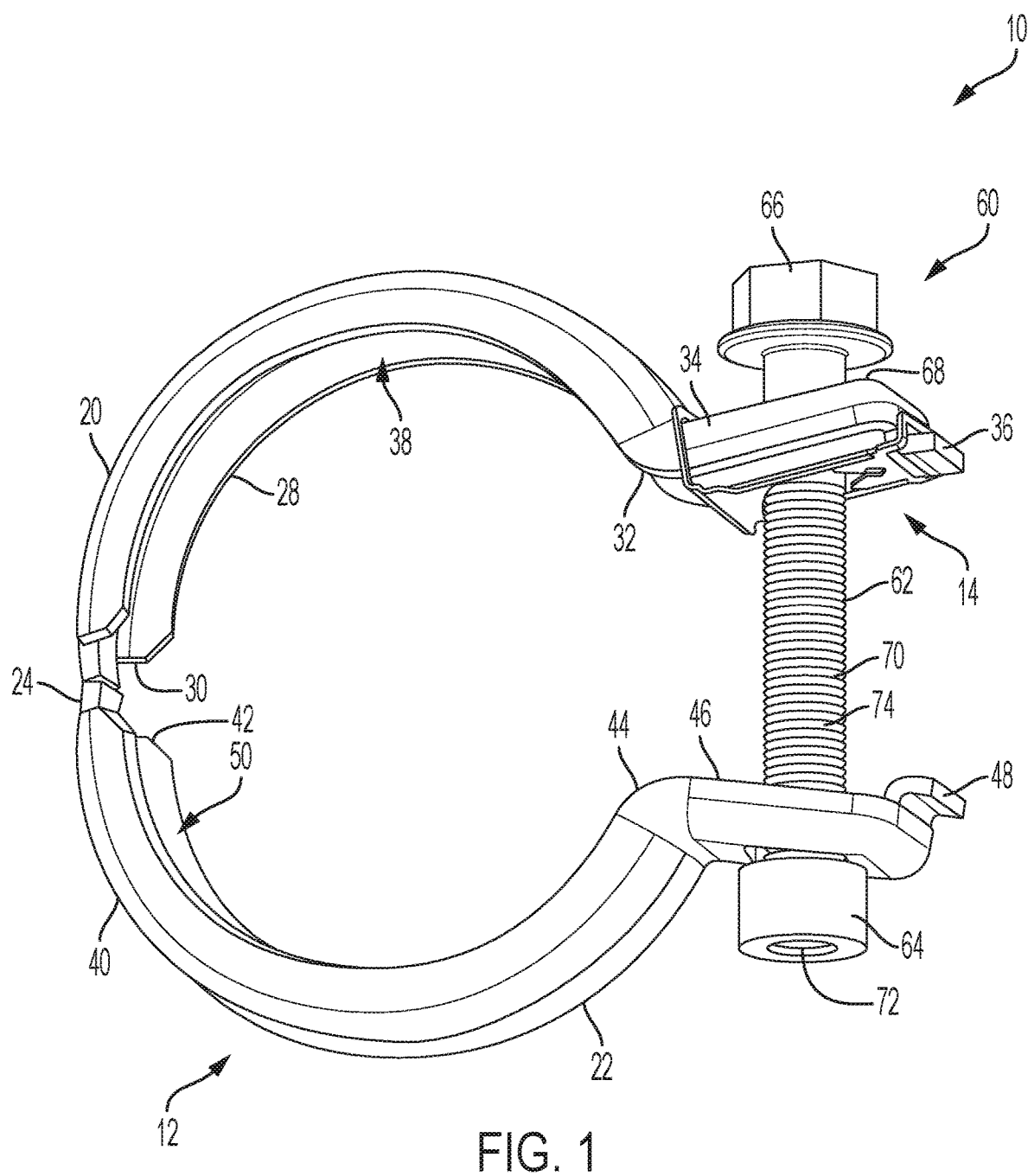
FIG. 1 is a perspective view of a retainer coupled to a clamp in one position.

While the concepts of the present disclosure are susceptible to various modifications and alternative forms, specific exemplary embodiments thereof have been illustrated by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, a clamp assembly 10 including a clamp 12 and a retaining clip or retainer 14 attached to the clamp 12 is shown. The clamp 12 is configured to be positioned over, for example, a pair of hoses, tubing, or pipes (not shown) to secure the hoses together to form a joint. As described in greater detail below, the retainer 14 maintains the clamp 12 in a position to, for example, facilitate installation of the clamp 12 on the hoses.

Figure 2:
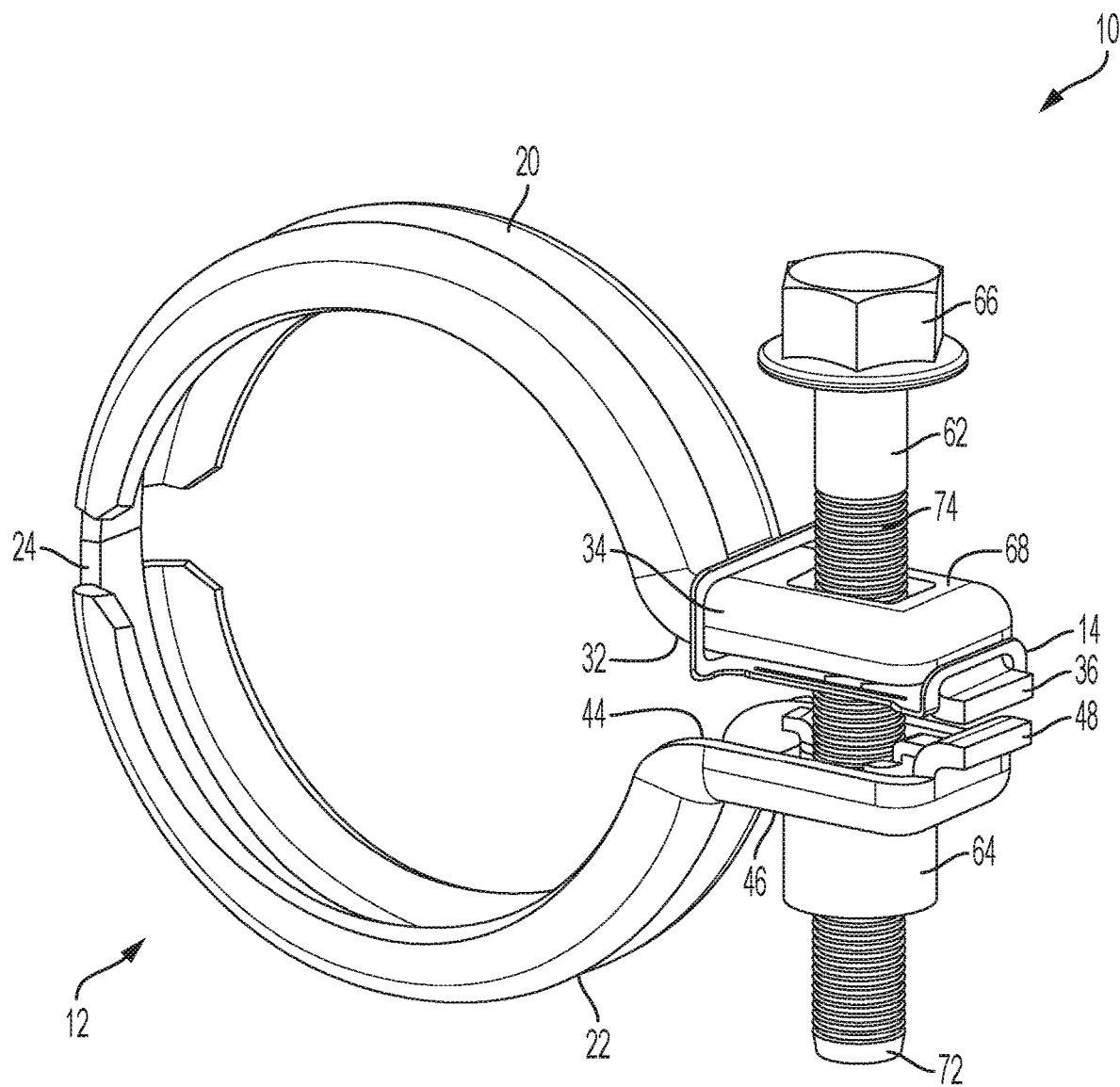
FIG. 2 is another perspective view of the retainer to the clamp in another position.

As shown in FIGS. 1-2, the clamp 12 includes a shell having a clamp segment 20 and a clamp segment 22 that are coupled together via a bracket 24. It should be appreciated that in some embodiments the bracket and the segments may be formed as a single, monolithic component. The clamp segment 20 includes a body 28 that extends from an end 30 hinged to the bracket 24 to an opposite end 32. An ear or flange 34 extends outwardly from the end 32, and a tip 36 extends outwardly from the outer end of the ear 34. A channel 38 sized to receive a portion of the hose or pipe ends is defined in the body 28 between the ends 30, 32.

The other clamp segment 22 includes a body 40 that extends from an end 42 hinged to the bracket 24 to an opposite end 44. An ear or flange 46 extends outwardly from the end 44, and a tip 48 extends outwardly from the outer end of the ear 46. A channel 50 sized to receive a portion of the hose or pipe ends is defined in the body 40 between the ends 42, 44.

The clamp 12 includes a tensioning mechanism 60 coupled to the ears 34, 46 of the segments 20, 22. In the illustrative embodiment, the tensioning mechanism 60 includes a bolt 62 and a retained nut 64 coupled to the bolt 62. The bolt 62 includes a head 66 that faces an outer surface 68 of the ear 34 of the segment 20 and an elongated rod 70 that extends from the head 66 through openings defined in the ears 34, 46 to a distal end 72. As shown in FIGS. 1-2, the elongated rod 70 includes a threaded shaft 74, and the threads are defined along the length of the rod 70 in the illustrative embodiment. The nut 64 of the tensioning mechanism 60 is coupled to the ear 46, as shown in FIGS. 1-2.

Figure 3:
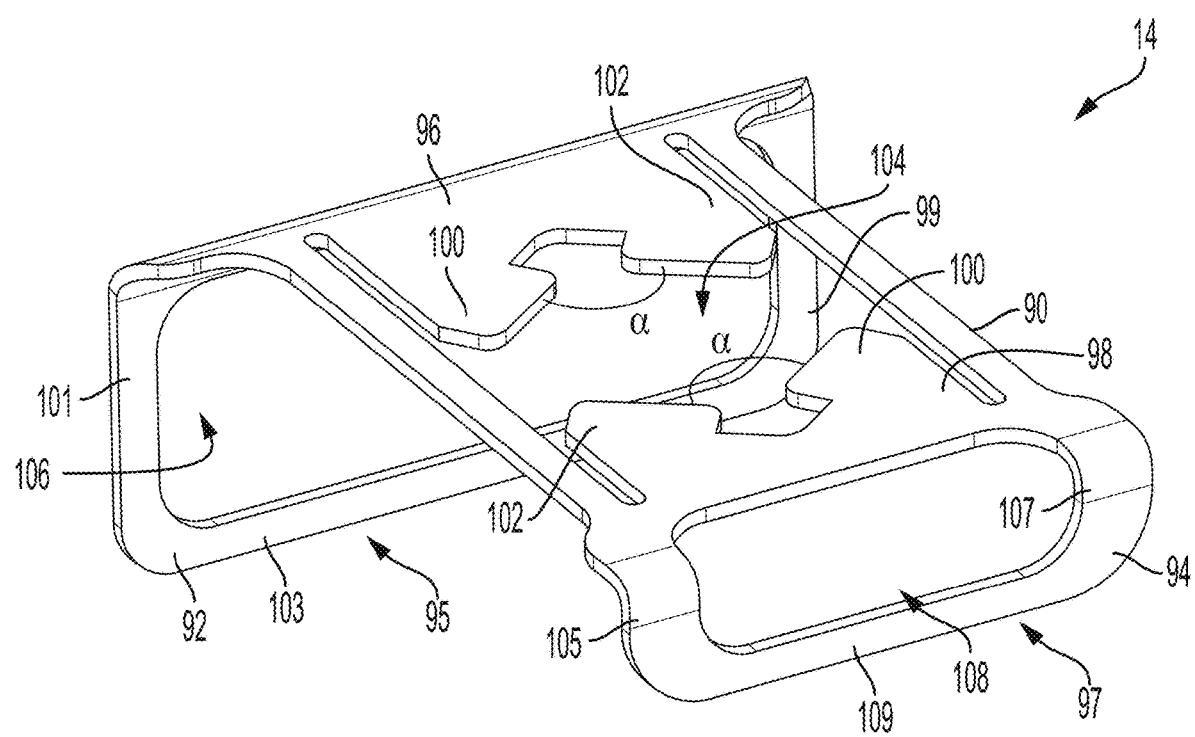
FIG. 3 is a perspective view of the retainer of FIGS. 1-2.
Figure 4:
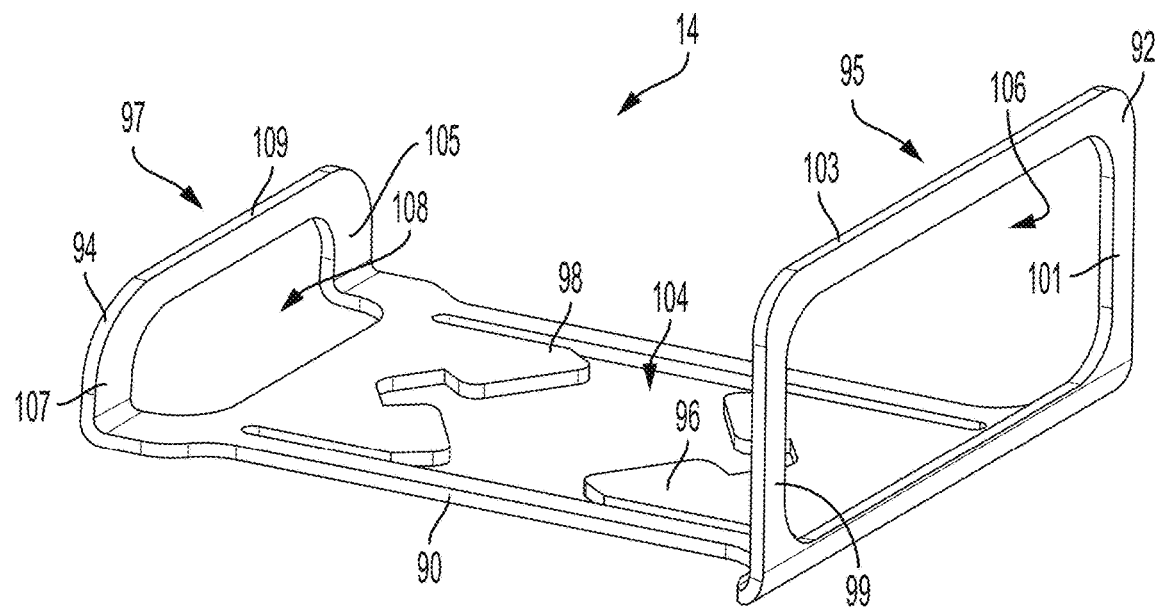
FIG. 4 is another perspective view of the retainer of FIGS. 1-3.
Figure 5:
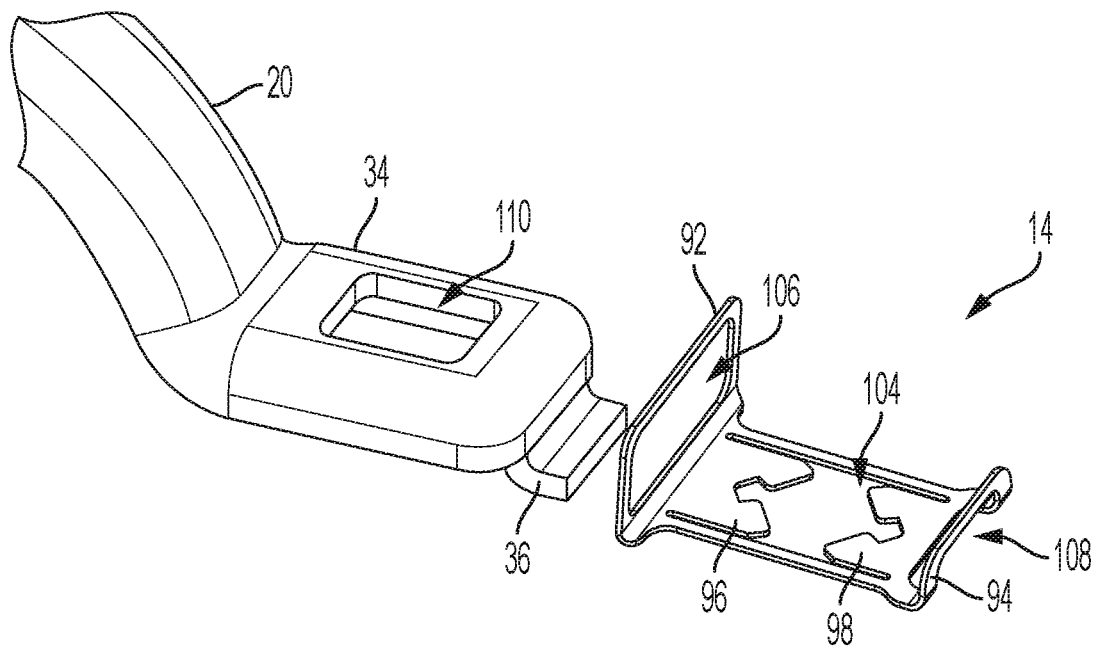
FIGS. 5-9 are perspective views showing a process of assembling the clamp and the retainer.
Figure 6:
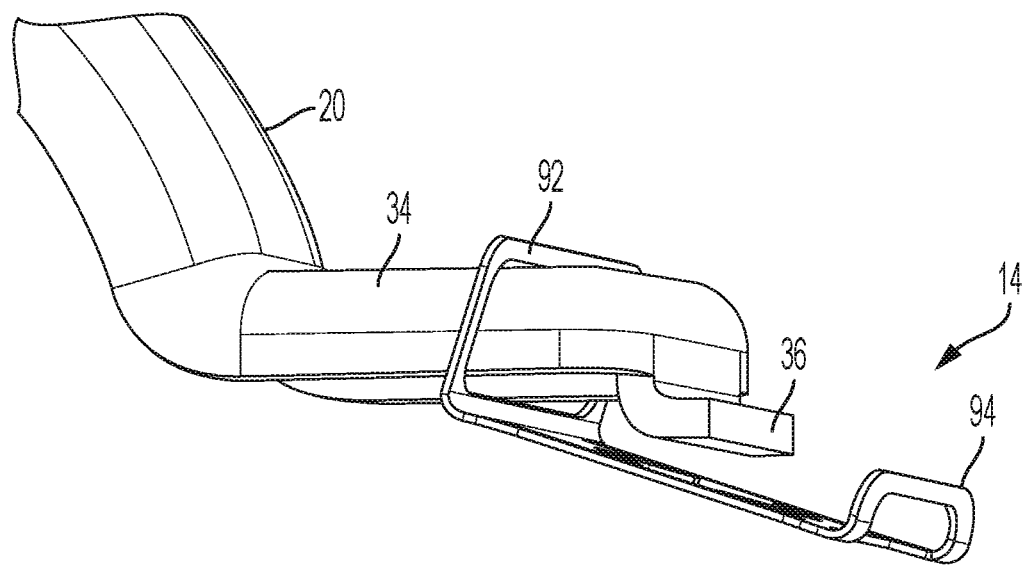
Figure 7:
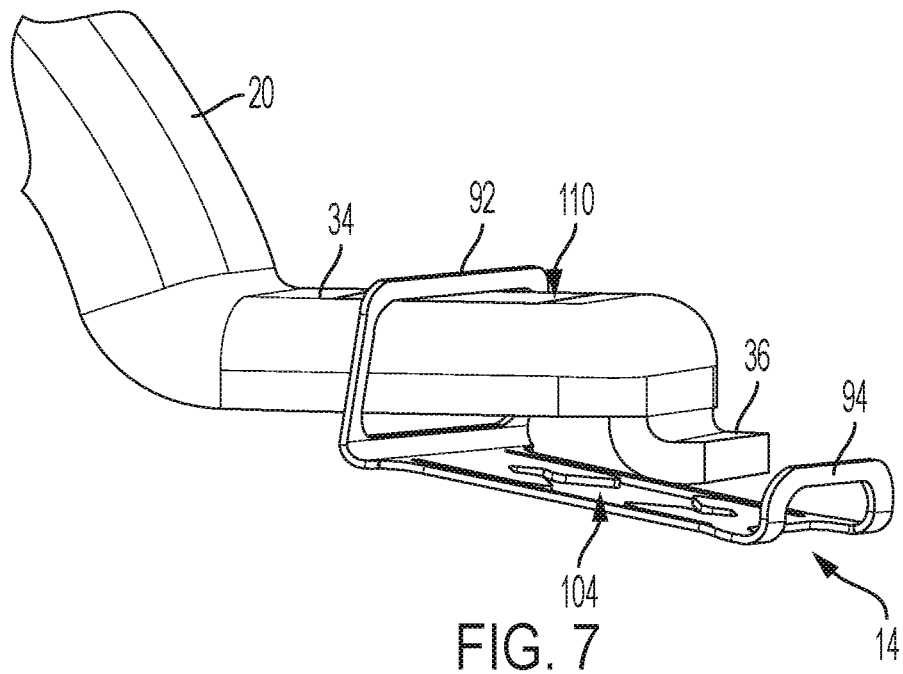

Referring now to FIGS. 3-4, the retainer 14, which is illustratively formed from a metallic material such as, for example, stainless steel, is configured to engage the threaded shaft 74 to retain the shaft in positions such as those shown in FIGS. 1-2. In the illustrative embodiment, the retainer 14 includes a frame 90 having an end 92 configured to be coupled to the ear 34 of the clamp segment 20 and another end 94 configured to be coupled to the tip 36 of the clamp segment 20. The retainer 14 also includes a cantilevered flange 96 coupled to the frame 90 and extending away from the end 92 and another cantilevered flange 98 that is coupled to the frame 90 opposite the cantilevered flange 96. The flange 98 extends away from the end 94 toward the flange 96, as shown in FIGS. 3-4.

Each of the flanges 96, 98 includes a pair of tips 100, 102 configured to engage the threaded shaft 74. As shown in FIG. 3, an angle α is defined between the tips 100, 102 of each of the flanges. In the illustrative embodiment, the angle α has a magnitude of about 90 degrees. The tips 100, 102 of the flanges 96, 98 cooperate to define an opening 104 sized to receive the threaded shaft 74.

As shown in FIGS. 3-4, the end 92 of the frame 90 includes a leg 95 formed with an opening 106 that is sized to receive the ear 34 of the segment 20. The leg 95 includes a pair of side segments 99, 101 and a crossbar 103 interconnecting distal ends of the side segments 99, 101. The other end 94 of the frame 90 includes a leg 97 formed with another opening 108 that is sized to receive the tip 36 of the segment 20. The leg 97 includes a pair of side segments 105, 107 and a crossbar 109 interconnecting distal ends of the side segments 105, 107. The opening 108 is smaller than the opening 106 and smaller than the ear 34 to prevent the frame 90 from being advanced out of alignment with the bolt opening 110 defined in the ear 34.

Figure 8:
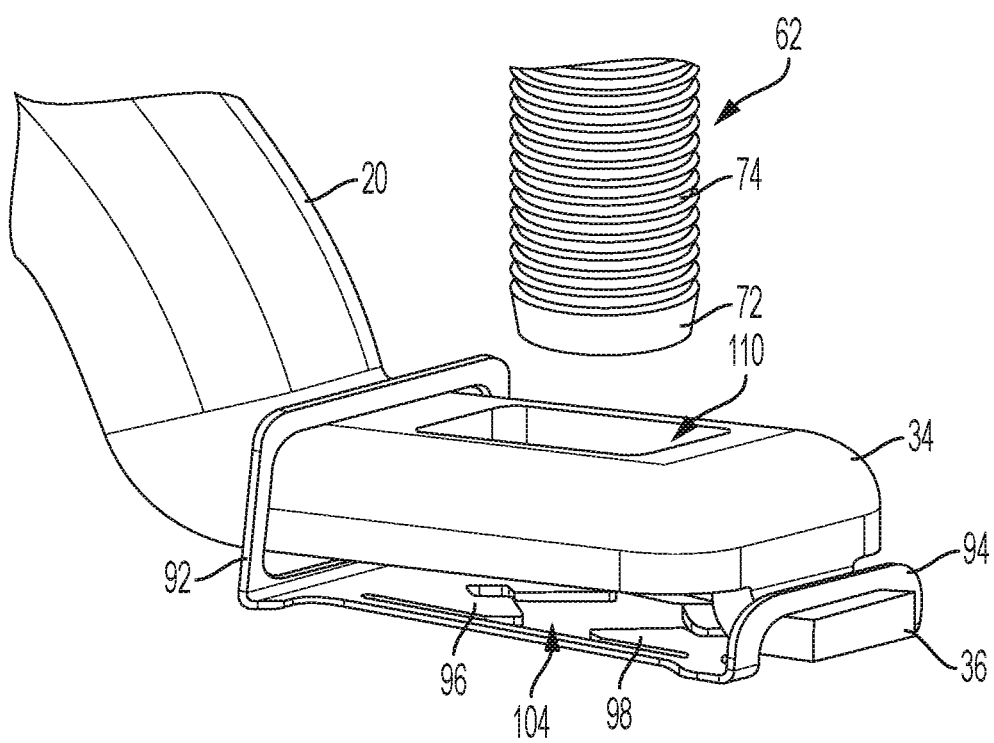
Figure 9:
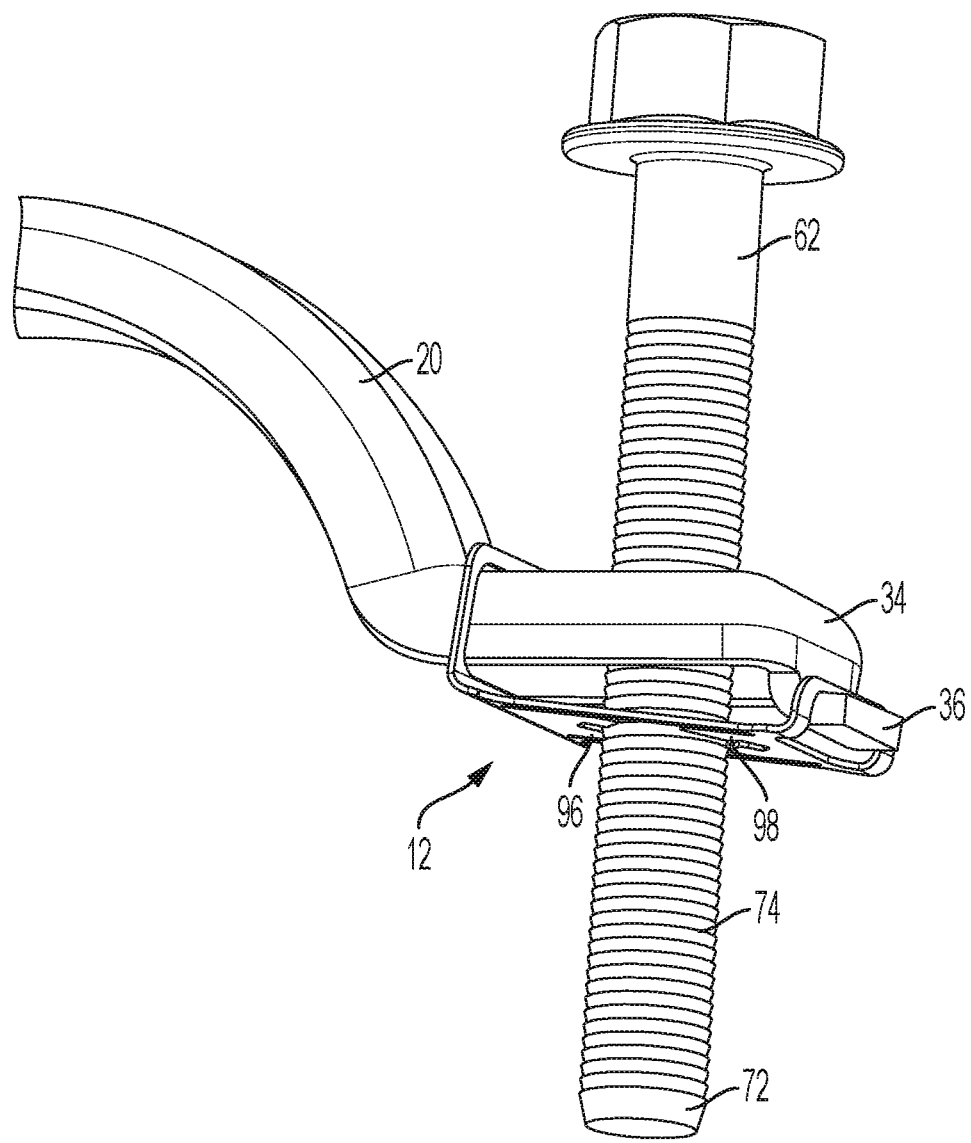
Figure 10:
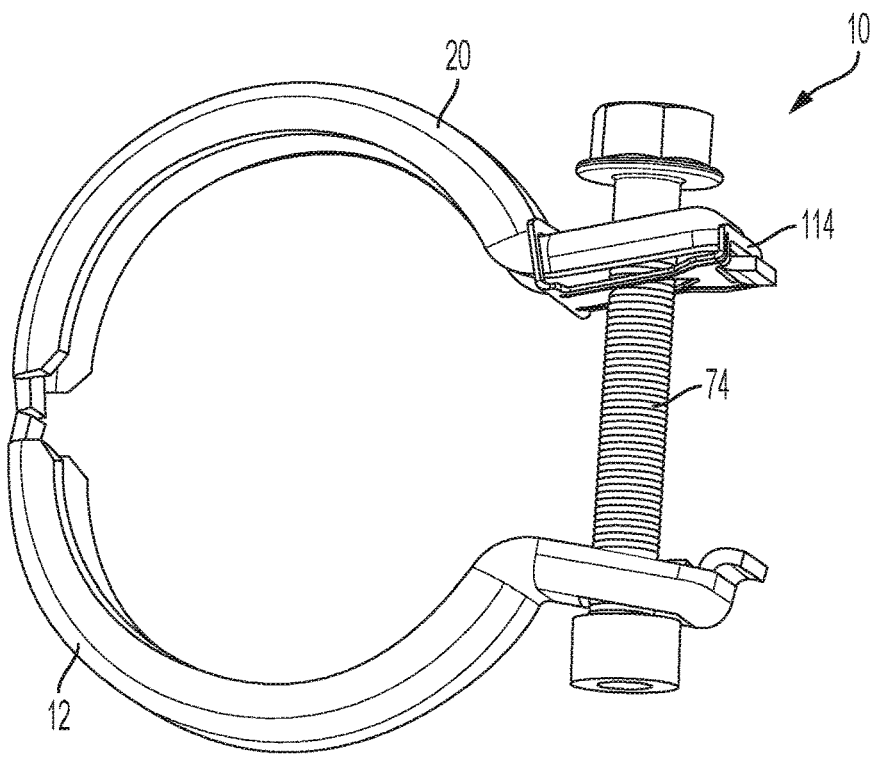
FIG. 10 is a perspective view of another embodiment of a retainer coupled to a clamp in one position.
Figure 11:
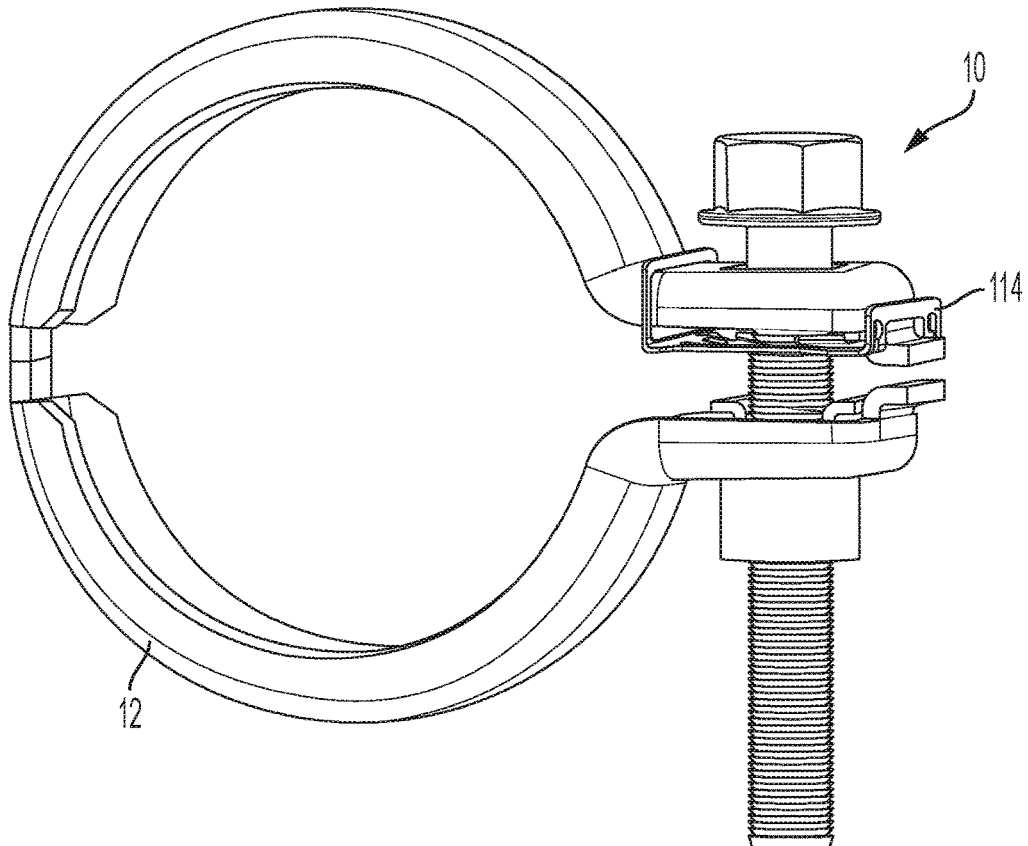
FIG. 11 is another perspective view of the retainer of FIG. 10 to the clamp in another position.
Figure 12:
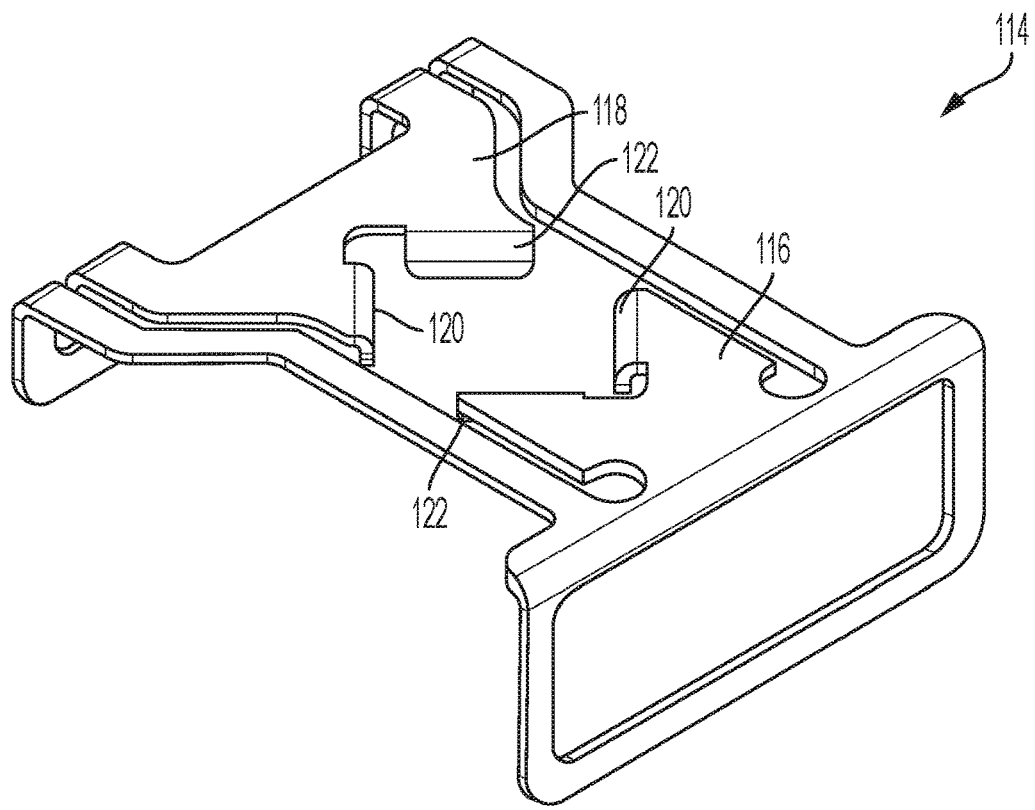
FIG. 12 is a perspective view of the retainer of FIGS. 10-11.
Figure 13:
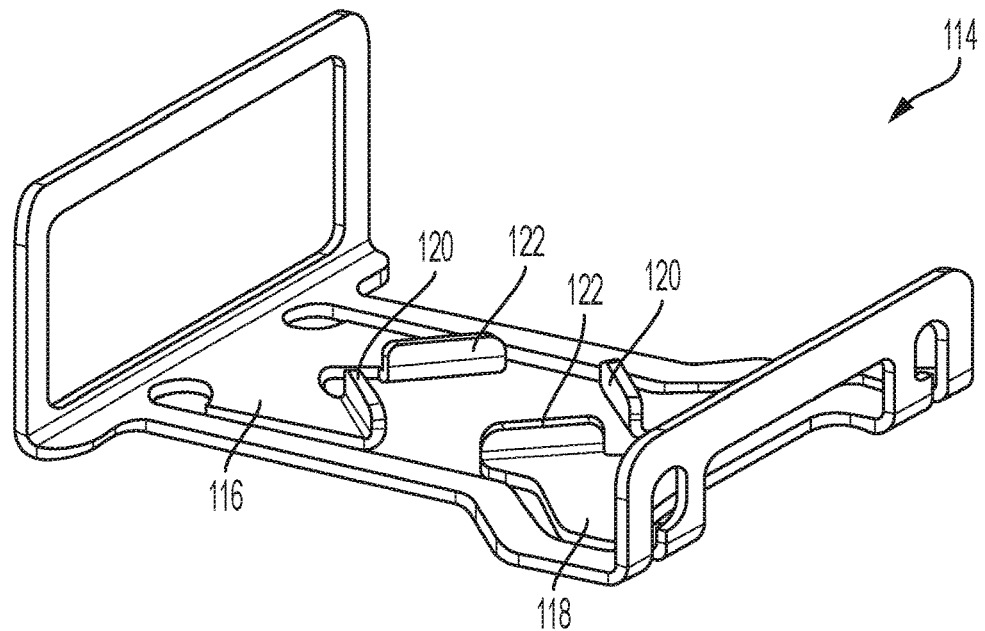
FIG. 13 is another perspective view of the retainer of FIGS. 10-11.

Referring now to FIGS. 5-9, various steps of assembling the retainer 14 with the clamp 12 are shown. As shown in FIG. 8-9, the bolt 62 may be aligned with the openings 104, 110 when the retainer 14 is properly positioned on the clamp 12. The bolt 62 may then be advanced through the openings 104, 110 to bring the threaded shaft 74 into contact with the flanges 96, 98 of the retainer 14. As the bolt 62 is advanced through the openings 104, 110, the flanges 96, 98 are configured to deflect elastically along the threads of the shaft 74. When the bolt 62 is placed in a desired position such as, for example, the position shown in FIG. 9, the flanges 96, 98 engage the threads of the shaft 74 to retain the bolt 62 in the desired position.

Referring now to FIGS. 10-13, another embodiment of the retainer (hereinafter retainer 114) is shown. The disclosure regarding retainer 14 applies equally to the retainer 114 except in instances of conflict therebetween, in which case the specific disclosure of retainer 114 governs. Similar to the retainer 14, the retainer 114 includes a cantilevered flange 116 and another cantilevered flange 118 opposite the cantilevered flange 116. Each of the flanges 116, 118 includes a pair of curved tips 120, 122 configured to engage the threaded shaft 74 of the bolt 62 to retain the bolt in position. The curved tips 120, 120 each extend with curvature from the direction of extension of the respective cantilevered flange 116, 118 into a direction through the opening 104.

Figure 14:
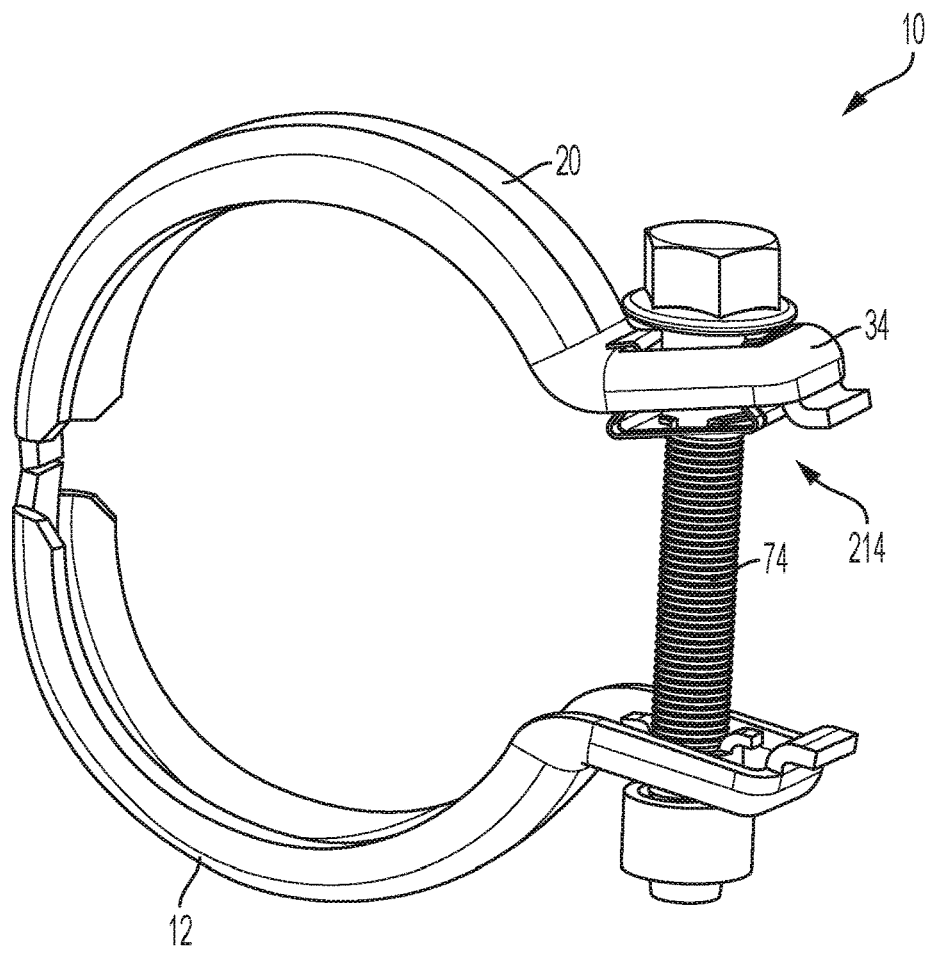
FIG. 14 is a perspective view of another embodiment of a retainer coupled to a clamp in one position.
Figure 15:
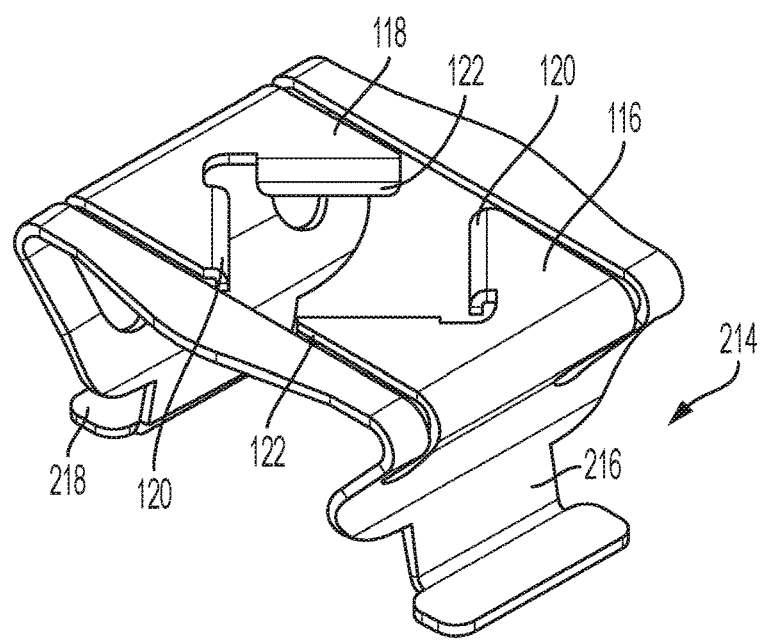
FIG. 15 is perspective view of the retainer of FIG. 14.

Referring now to FIGS. 14-15, another embodiment of the retainer (hereinafter retainer 214) is shown. The disclosure regarding retainers 14 and 114 applies equally to the retainer 214 except in instances of conflict between the specific disclosure of retainer 214 and any of retainers 14 and 114, in which case the specific disclosure of retainer 214 governs. Similar to the retainer 114, the retainer 214 includes a cantilevered flange 116 and another cantilevered flange 118 opposite the cantilevered flange 116. Each of the flanges 116, 118 includes a pair of curved tips 120, 122 configured to engage the threaded shaft 74 of the bolt 62 to retain the bolt in position. In the illustrative embodiment, the retainer 214 also includes legs 216, 218 configured to engage the ear 34 of the segment 20 to couple the retainer 214 to the clamp 12.

It will be appreciated that the devices and methods described herein have broad applications. The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this disclosure have been explained and illustrated in exemplary embodiments.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

The invention claimed is:

1. A clamp assembly comprising:
    a pair of clamp segments sized to be positioned over a joint connection, the pair of clamp segments being moveable between an open position and a contracted position, wherein a first clamp segment of the pair of clamp segments includes an ear having an ear opening defined therein and a tab extending from the ear,
    a tensioner including a threaded shaft, the tensioner being operable to hold the pair of clamp segments in the contracted position, and
    a retainer configured to couple with the first clamp segment and to engage the threaded shaft to retain the threaded shaft in the ear opening when the pair of clamp segments is in the open position, wherein the retainer includes (i) a first opening sized to receive the ear of the first clamp segment and (ii) a second opening sized to receive the tab of the first clamp segment.

2. The clamp assembly of claim 1, wherein the retainer includes a cantilevered flange configured to engage the threaded shaft.

3. The clamp assembly of claim 2, wherein the cantilevered flange includes a pair of curved tips configured to engage the threaded shaft.

4. The clamp assembly of claim 2, wherein the cantilevered flange includes a pair of tips configured to engage the threaded shaft, and wherein a 90 degree angle is defined between the pair of tips.

5. The clamp assembly of claim 1, wherein the retainer includes (i) a first cantilevered flange configured to engage the threaded shaft and (ii) a second cantilevered flange configured to engage the threaded shaft, and wherein a retainer opening for receiving the threaded shaft is defined between the first and second cantilevered flanges.

6. The clamp assembly of claim 5, wherein the threaded shaft is positioned in the retainer opening when the pair of clamp segments is in the open position and when the pair of clamp segments is in the contracted position.

7. The clamp assembly of claim 5, wherein the first cantilevered flange includes a first pair of tips configured to engage the threaded shaft, and wherein the second cantilevered flange includes a second pair of tips configured to engage the threaded shaft.

8. The clamp assembly of claim 7, wherein the first pair of tips are arranged along first and second sides of a square and the second pair of tips are arranged along third and fourth sides of the square such that the retainer opening has a generally square shape.

9. A retainer for a clamp assembly, the retainer comprising:
    a frame having a first end and a second end opposite the first end, and
    a first cantilevered flange coupled to the first end of the frame and extending toward the second end of the frame, the first cantilevered flange being configured to engage a threaded bolt of the clamp assembly,
    wherein the first end of the frame includes a first leg formed with a first opening sized to receive a first portion of a shell of the clamp assembly to couple the retainer to the clamp assembly, and
    wherein the second end of the frame includes a second leg formed with a second opening sized to receive a second portion of the shell of the clamp assembly to couple the retainer to the shell.

10. The retainer of claim 9, wherein the first leg includes a first pair of side segments and a first crossbar interconnecting distal ends of the first pair of side segments, and wherein the second leg includes a second pair of side segments and a second crossbar interconnecting distal ends of the second pair of side segments.

11. The retainer of claim 10, wherein the first and second pairs of side segments are arranged perpendicular to the first cantilevered flange.

12. The retainer of claim 11, wherein the first and second crossbars are arranged parallel to the first cantilevered flange.

13. The retainer of claim 9, wherein the first opening has a first height measured perpendicular to the first cantilevered flange, wherein the second opening has a second height measured perpendicular to the first cantilevered flange, and wherein the second height is smaller than the first height.

14. The retainer of claim 13, wherein the first opening has a first width measured parallel to the first cantilevered flange, wherein the second opening has a second width measured parallel to the first cantilevered flange, and wherein the second width is smaller than the first width.

15. The retainer of claim 9, further comprising a second cantilevered flange coupled to the second end of the frame and extending toward the first end of the frame, the second cantilevered flange being configured to engage the threaded bolt of the clamp assembly.

16. The retainer of claim 15, wherein the first cantilevered flange includes first and second tips configured to engage the threaded bolt of the clamp assembly, wherein the second cantilevered flange includes third and fourth tips configured to engage the threaded bolt of the clamp assembly, wherein the first tip opposes the third tip, and wherein the second tip opposes the fourth tip.

17. A retainer for a clamp assembly, the retainer comprising:
    a frame having a first end and a second end opposite the first end,
    a first cantilevered flange coupled to the first end of the frame and extending toward the second end of the frame, the first cantilevered flange being configured to engage a threaded bolt of the clamp assembly,
    a first leg coupled to the first end of the frame and arranged at a first angle relative to the first cantilevered flange, and
    a second leg coupled to the second end of the frame and arranged at a second angle relative to the first cantilevered flange,
    wherein the first and second legs are configured to engage a shell of the clamp assembly to couple the retainer to the shell.

18. The retainer of claim 17, further comprising a second cantilevered flange coupled to the second end of the frame and extending toward the first end of the frame, the second cantilevered flange being configured to engage the threaded bolt of the clamp assembly.

19. The retainer of claim 17, wherein the first and second legs are configured to extend through an opening in the shell that also receives the threaded bolt when the retainer is coupled to the shell.

20. The retainer of claim 19, wherein the first and second angles are acute angles.

* * * * *